United States Patent
Ota et al.

(10) Patent No.: US 10,204,652 B2
(45) Date of Patent: *Feb. 12, 2019

(54) OPTICAL RECORDING MEDIUM HAVING A PLURALITY OF RECORDING LAYERS CAPABLE OF SUPPRESSING OFF-TRACK

(71) Applicant: SONY CORPORATION, Tokyo (JP)

(72) Inventors: Yo Ota, Tokyo (JP); Kensaku Takahashi, Kanagawa (JP); Manami Miyawaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/911,917

(22) Filed: Mar. 5, 2018

(65) Prior Publication Data

US 2018/0197572 A1    Jul. 12, 2018

Related U.S. Application Data

(63) Continuation of application No. 15/115,791, filed as application No. PCT/JP2015/000366 on Jan. 28, 2015, now Pat. No. 9,911,451.

(30) Foreign Application Priority Data

Feb. 14, 2014  (JP) .................... 2014-026304

(51) Int. Cl.
*G11B 7/24062*    (2013.01)
*G11B 7/24035*    (2013.01)
(Continued)

(52) U.S. Cl.
CPC ...... *G11B 7/24062* (2013.01); *G11B 7/00718* (2013.01); *G11B 7/243* (2013.01);
(Continued)

(58) Field of Classification Search
None
See application file for complete search history.

(56) References Cited

U.S. PATENT DOCUMENTS

| 7,321,481 B2 * | 1/2008 | Inoue | G11B 7/00455 360/135 |
| 2008/0019261 A1 * | 1/2008 | Nakai | G11B 7/00456 369/275.4 |

(Continued)

FOREIGN PATENT DOCUMENTS

| CN | 103578503 A | 2/2014 |
| EP | 0737966 A1 * | 10/1996 ............. G11B 7/127 |

(Continued)

OTHER PUBLICATIONS

Notice of Allowance for U.S. Appl. No. 15/115,791, dated Oct. 26, 2017, 05 pages.

(Continued)

*Primary Examiner* — Tan X Dinh
(74) *Attorney, Agent, or Firm* — Chip Law Group

(57) ABSTRACT

An optical recording medium includes a light-receiving surface that receives incident light and at least three information signal layers on which information signals are to be optically recorded. Among the at least three information signal layers, the information signal layer closest to the light-receiving surface has a reflectance in a range of 4% to 11%.

14 Claims, 9 Drawing Sheets

(51) Int. Cl.
*G11B 7/243* (2013.01)
*G11B 7/24076* (2013.01)
*G11B 7/007* (2006.01)
*G11B 7/26* (2006.01)
*G11B 7/24073* (2013.01)
*G11B 7/2433* (2013.01)
*G11B 7/24038* (2013.01)
*G11B 7/085* (2006.01)

(52) U.S. Cl.
CPC ........ *G11B 7/2433* (2013.01); *G11B 7/24035* (2013.01); *G11B 7/24073* (2013.01); *G11B 7/24076* (2013.01); *G11B 7/266* (2013.01); *G11B 7/08541* (2013.01); *G11B 7/24038* (2013.01); *G11B 2007/2431* (2013.01); *G11B 2007/2432* (2013.01); *G11B 2007/24304* (2013.01); *G11B 2007/24306* (2013.01); *G11B 2007/24308* (2013.01); *G11B 2007/24312* (2013.01); *G11B 2007/24314* (2013.01)

(56) References Cited

U.S. PATENT DOCUMENTS

| | | | |
|---|---|---|---|
| 2008/0151729 A1* | 6/2008 | Satoh | G11B 7/1275 369/94 |
| 2009/0042046 A1* | 2/2009 | Sakaue | G11B 7/24038 428/469 |
| 2011/0177280 A1* | 7/2011 | Tsuchino | G11B 7/24038 428/64.4 |
| 2014/0030489 A1 | 1/2014 | Miki | |
| 2016/0275983 A1* | 9/2016 | Takahashi | G11B 7/24038 |

FOREIGN PATENT DOCUMENTS

| | | |
|---|---|---|
| JP | 02-203441 A | 8/1990 |
| JP | 05-062212 A | 3/1993 |
| JP | 10-172192 A | 6/1998 |
| JP | 4873094 B2 | 2/2012 |
| JP | 2014-026704 A | 2/2014 |
| WO | 2010/070811 A1 | 6/2010 |
| WO | 2013/183277 A1 | 12/2013 |

OTHER PUBLICATIONS

Final Office Action for U.S. Appl. No. 15/115,791, dated Jun. 29, 2017, 06 pages.

Non-Final Office Action for U.S. Appl. No. 15/115,791, dated Dec. 30, 2016, 09 pages.

International Search Report and Written Opinion of PCT Application No. PCT/JP2015/000366, dated Mar. 3, 2015, 08 pages of English Translation and 08 pages of ISRWO.

International Preliminary Report on Patentability of PCT Application No. PCT/JP2015/000366, dated Aug. 25, 2016, 07 pages of English Translation and 05 pages of IPRP.

* cited by examiner

THICKNESS $t_2$ OF OPTICALLY TRANSPARENT LAYER-SIDE DIELECTRIC LAYER/
THICKNESS $t_1$ OF SUBSTRATE-SIDE DIELECTRIC LAYER

THICKNESS $t_2$ OF OPTICALLY TRANSPARENT LAYER-SIDE DIELECTRIC LAYER/
THICKNESS $t_1$ OF SUBSTRATE-SIDE DIELECTRIC LAYER

OPTICAL RECORDING MEDIUM HAVING A PLURALITY OF RECORDING LAYERS CAPABLE OF SUPPRESSING OFF-TRACK

CROSS REFERENCE TO RELATED APPLICATIONS

This application is a continuation application of U.S. patent application Ser. No. 15/115,791, filed Aug. 1, 2016, which is a national stage entry of PCT application PCT/JP2015/000366 filed Jan. 28, 2015 and which claims the benefit of Japanese Priority Patent Application JP 2014-026304 filed Feb. 14, 2014, the entire contents of which are incorporated herein by reference.

TECHNICAL FIELD

The present technology relates to an optical recording medium. Specifically, the present technology relates to an optical recording medium having a plurality of information signal layers.

BACKGROUND ART

Techniques for producing information signal layers in the form of a multilayer structure are widely used to increase the storage capacity of high-density optical recording media such as Blu-ray Disc (BD) (registered trademark)). In a common multilayer optical recording medium, the respective information signal layers have the same reflectance when viewed from the light-receiving surface side. For example, Patent Document 1 discloses that a multilayer optical disk is designed to have three or more recording layers with substantially the same reflectance.

In recent years, there has been a demand for a further increase in the storage capacity of multilayer optical recording media. In order to meet such a demand, studies have been conducted on the use of a method of recording data on both groove and land tracks (hereinafter referred to as the "land/groove recording method" as appropriate) instead of a method of recording data on a groove track (hereinafter referred to as the "groove recording method" as appropriate) for the design of multilayer optical recording media.

CITATION LIST

Patent Document

Patent Document 1: Japanese Patent No. 4873094

SUMMARY OF THE INVENTION

Problems to be Solved by the Invention

In a multilayer optical recording medium, off-track is more likely to occur on the information signal layer closest to the light-receiving surface. Such off-track can cause a more serious problem in the land/groove recording method than in the groove recording method.

It is therefore an object of the present technology to provide an optical recording medium capable of suppressing the occurrence of off-track.

Solutions to Problems

To solve the problems, the present technology provides an optical recording medium including a plurality of information signal layers, in which, among the plurality of information signal layers, an information signal layer closest to the light-receiving surface has a reflectance of more than 4%.

In the present technology, the information signal layer closest to the light-receiving surface has a reflectance of more than 4%. This feature makes it possible to reduce the thickness of the information signal layer closest to the light-receiving surface. Therefore, undesired shaping of the information signal layer can be suppressed during deposition.

Effects of the Invention

As described above, the present technology can suppress the occurrence of off-track.

MODE FOR CARRYING OUT THE INVENTION

Figure 1A:
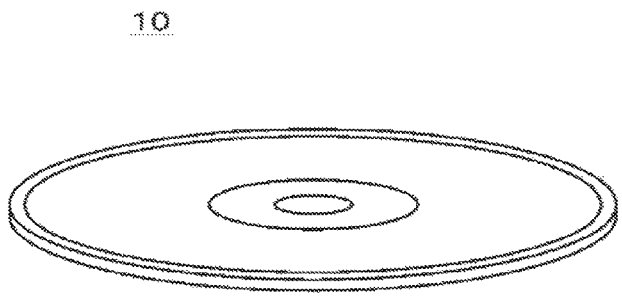
FIG. 1A is a perspective view showing an example of the appearance of an optical recording medium according to an embodiment of the present technology.

In the present technology, the reflectance of the information signal layer refers to the light-receiving-surface-side reflectance of the information signal layer.

In the present technology, a plurality of information signal layers are preferably provided on a substrate, and a cover layer is preferably provided on the information signal layers. The cover layer may have any thickness. Examples of the cover layer include a substrate, a sheet, and a coating layer. A high NA objective lens is used for high-density optical recording media. Therefore, a thin optically transparent layer such as a sheet or a coating layer is preferably used as the cover layer, and light is preferably applied to the optically transparent layer side when recording and reproduction of information signals are performed. In this case, the substrate used may also be an opaque one. Depending on the format of the optical recording medium, at least one of the cover layer-side surface and the substrate-side surface may be appropriately selected as the surface on which light for recording or reproducing information signals is to be incident.

In the present technology, in order to improve storage reliability, the information signal layer preferably further includes a dielectric layer on at least one of its surfaces, and more preferably further includes dielectric layers on both of its surfaces. Alternatively, in order to simplify the layered structure or the manufacturing facility, the information signal layer is preferably used alone without any dielectric layer provided on any surface of the information signal layer.

In the present technology, all the plurality of information signal layers preferably have the same layer structure in view of productivity. When the plurality of information signal layers have the same layer structure including a first dielectric layer, a recording layer, and a second dielectric layer, the first dielectric layer, the recording layer, and the second dielectric layer in each information signal layer preferably contain the same material in view of productivity.

Embodiments of the present technology will be described in the following order.
1 Outline
2 Features of optical recording medium
3 Method for producing optical recording medium
4 Advantageous effects

[1 Outline]

The inventors have conducted intensive studies to suppress the occurrence of off-track on land/groove recording-type multilayer optical recording media. The groove recording-type multilayer optical recording medium is generally so designed that the information signal layer closest to the light-receiving surface is relatively thick and has a relatively low reflectance so that all the information signal layers have a reflectance of 2% to 4%.

Unfortunately, the rate of track cross signal displacement increases as the thickness of the information signal layer closest to the light-receiving surface is increased as mentioned above. According to the findings of the inventors, this is because as follows. Information signal layers are formed by thin film-forming techniques such as sputtering. Therefore, information signal layers are not uniformly deposited on the land and the groove during the film formation, and the edges of information signal layers deposited on the land and the groove tend to be asymmetric. As the thickness of information signal layers is increased as mentioned above, the asymmetry between the edges of the land and the groove is enhanced, which can increase the rate of track cross signal displacement.

In the groove recording-type multilayer optical recording medium, information signals are not recorded on the land track, and therefore, the rate of track cross signal displacement falls within the allowable range even when it is high.

However, a land/groove recording-type multilayer optical recording medium, in which information signals are recorded on both groove and land tracks, has a problem in that an increase in the rate of track cross signal displacement can make it difficult to form the desired recording mark or can cause crosstalk.

Thus, the inventors have conducted intensive studies to solve the problems. As a result, the inventors have found that when the information signal layer closest to the light-receiving surface is formed to have a reflectance of more than 4%, the edges of the land and the groove can be made less asymmetric so that the rate of track cross signal displacement can be reduced.

[2 Features of Optical Recording Medium]

FIG. 1A is a perspective view showing an example of the appearance of an optical recording medium according to an embodiment of the present technology. The optical recording medium 10 has a disk shape with an opening (hereinafter referred to as a "center hole") formed at its center. The optical recording medium 10 may have any other shape such as a card shape.

Figure 1B:
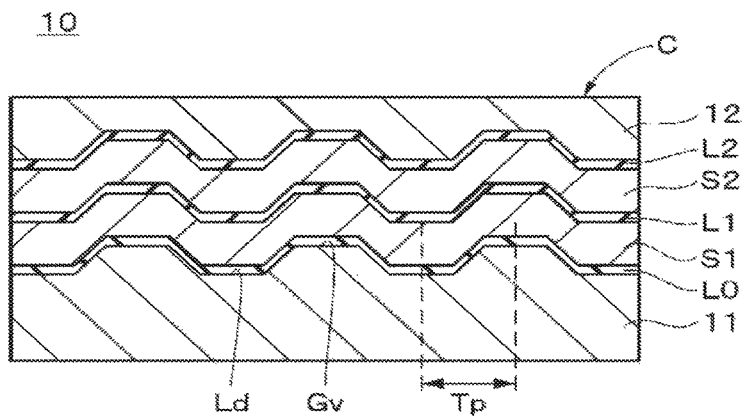
FIG. 1B is a schematic cross-sectional view showing an example of the structure of an optical recording medium according to an embodiment of the present technology.

FIG. 1B is a schematic cross-sectional view showing an example of the structure of an optical recording medium according to an embodiment of the present technology. The optical recording medium 10 is a land/groove recording-type write-once multilayer optical recording medium. As shown in FIG. 1B, the medium 10 includes a substrate 11, and an information signal layer L0, an intermediate layer S1, an information signal layer L1, an intermediate layer S1, an information signal layer L2, and an optically transparent layer 12 as a cover layer, which are stacked in this order on a principal surface of the substrate 11. Hereinafter, the information signal layers L0 to L2 are also called the information signal layers L when they are not distinguished from one another.

The information signal layer L has a concave track (hereinafter referred to as a "land track") and a convex track (hereinafter referred to as a "groove track"). The optical recording medium 10 according to an embodiment is designed to allow information signals to be recorded on both the land and groove tracks. For high recording density, the pitch Tp between the land and groove tracks is preferably 0.225 nm or less.

In the optical recording medium 10 according to an embodiment, a laser beam incident on the surface C of the optically transparent layer 12 is applied to each of the information signal layers L0 to L2 when information signals are recorded or reproduced. For example, a laser beam with a wavelength in the range of 400 nm to 410 nm is collected by an objective lens with a numerical aperture in the range of 0.84 to 0.86 and then applied to each of the information signal layers L0 to L2 from the optically transparent layer 12 side when information signals are recorded or reproduced. The optical recording medium 10 with such a structure may be, for example, a multilayer BD-R. The laser beam for recording or reproducing information signals on or from the information signal layers L0 to L2 is applied to the surface C. Hereinafter, the surface C will be referred to as the light-receiving surface C.

Hereinafter, the components of the optical recording medium 10, specifically, the substrate 11, the information signal layers L0 to L2, the intermediate layers S1 and S2, and the optically transparent layer 12 will be described, respectively.

(Substrate)

The substrate 11 has, for example, a disk shape with a center hole formed at its center. One principal surface of the substrate 11 is, for example, a concave-convex surface, and the information signal layer L0 is formed on the concave-convex surface. Hereinafter, a concave part of the concave-convex surface is referred to as a land Ld, and a convex part of the concave-convex surface is referred to as a groove Gv.

The land Ld and the groove Gv may have any of various shapes, such as a spiral shape and a concentric circular shape. The land Ld and/or the groove Gv may also be, for example, wobbled for stabilization of linear velocity, addition of address information, or other purposes.

The size (diameter) of the substrate 11 is selected, for example, to be 120 mm. The thickness of the substrate 11 is selected in view of rigidity, preferably to be 0.3 mm to 1.3 mm, more preferably 0.6 mm to 1.3 mm, typically 1.1 mm. The size (diameter) of the center hole is selected, for example, to be 15 mm.

The substrate 11 is made of, for example, a plastic material or glass, preferably a plastic material in view of cost. Examples of such a plastic material include polycarbonate resin, polyolefin resin, and acrylic resin.

(Information Signal Layers)

The information signal layers L0 to L2 each include at least a recording layer capable of storing information signals when a laser beam is applied. The information signal layers L0 to L2 each have, for example, a storage capacity of 35 GB or more for a wavelength of 405 nm and a condenser numerical aperture NA of 0.85. The information signal layer L2 closest to the light-receiving surface C preferably has a thickness of 40 nm to 90 nm, more preferably 59 nm to 72 nm.

Figure 2:
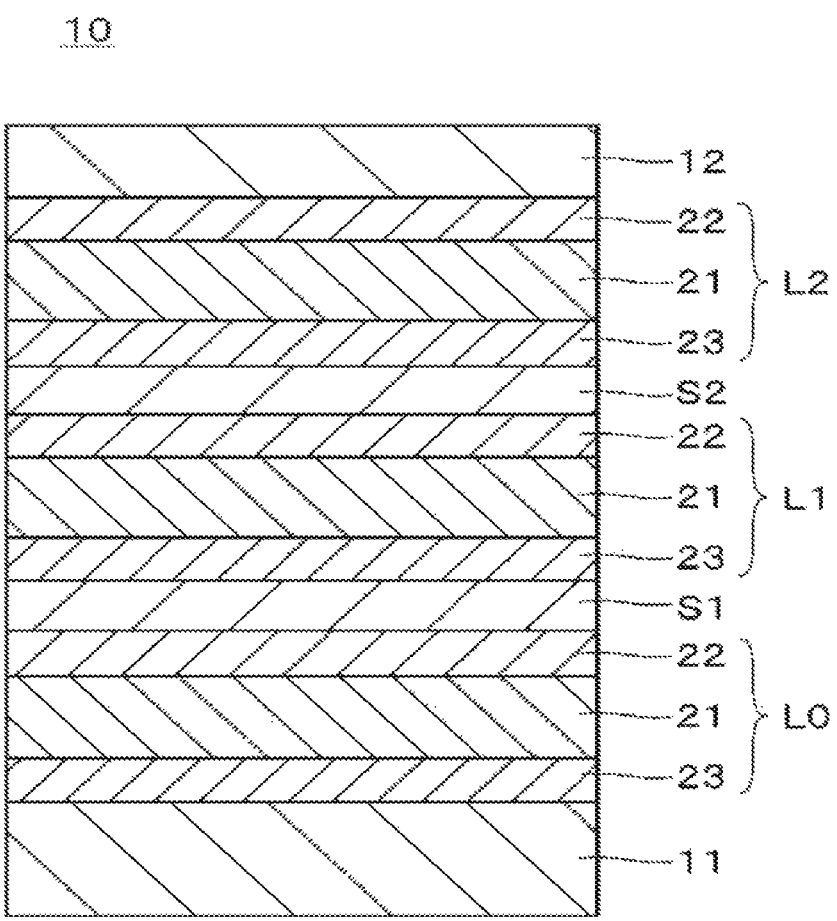
FIG. 2 is a schematic diagram showing an example of the structure of each information signal layer.

FIG. 2 is a schematic diagram showing an example of the structure of each information signal layer. Referring to FIG. 2, the information signal layers L0 to L2 each include a recording layer 21 having a lower surface (first principal surface) and an upper surface (second principal surface), a dielectric layer 23 provided adjacent to the lower surface of the recording layer 21, and a dielectric layer 22 provided adjacent to the upper surface of the recording layer 21. This structure can improve the durability of the recording layer 21.

(Recording Layer)

The recording layer 21 includes, for example, a complex oxide containing a first metal and a second metal. The first metal is capable of forming a substantially transparent oxide with an extinction coefficient k equal to or near 0. The recording layer 21 containing an oxide of the first metal can prevent an oxide of the second metal from thermally expanding too much during recording. This makes it possible to ensure a wide recording power margin and to suppress transmittance fluctuations before and after recording. The first metal is, for example, one or more selected from the group consisting of W, Zn, Mg, Zr, Si, In, Sn, Sb, and Te. The second metal is a material capable of forming an oxide having a certain level of absorption coefficient α (in other words, a certain level of extinction coefficient k) and also having an absolute value of standard free energy of formation lower than that of the first metal. Since the recording layer 21 contains an oxide of the second metal, the recording layer 21 can convert a laser beam to heat through absorption and can expand by releasing oxygen. The second metal is, for example, one or more selected from the group consisting of Mn, Pd, Fe, Ni, Cu, Ag, and Ru.

(Dielectric Layer)

The dielectric layers 22 and 23 can function as gas barrier layers to improve the durability of the recording layer 21. The dielectric layers 22 and 23 can also prevent oxygen from escaping from the recording layer 21 and prevent $H_2O$ from infiltrating into the recording layer 21, which makes it possible to prevent changes (generally detected as a reduction in reflectance) in the quality of the recording layer 21 and to ensure the quality necessary for the recording layer 21.

The ratio ($t_2/t_1$) of the thickness $t_2$ of the dielectric layer 22 on the optically transparent layer 12 side to the thickness $t_1$ of the dielectric layer 23 on the substrate 11 side is preferably from 0.75 to 1.5 in order to suppress changes in normalized push-pull ratio (NPPR) during the land recording and the groove recording.

The ratio ($t_2/t_1$) is preferably about 1 in order to reduce the rate of track cross signal displacement or reduce the absolute value of the i-MLSE difference between the land Ld and the groove Gv. In other words, the dielectric layers 22 and 23 preferably have substantially the same thickness.

The dielectric layers 22 and 23 are each made of, for example, a material including at least one selected from the group consisting of an oxide, a nitride, a sulfide, a carbide, and a fluoride. The dielectric layers 22 and 23 may be made of the same material or different materials. The oxide may be, for example, an oxide of one or more elements selected from the group consisting of In, Zn, Sn, Al, Si, Ge, Ti, Ga, Ta, Nb, Hf, Zr, Cr, Bi, and Mg. The nitride may be, for example, a nitride of one or more elements selected from the group consisting of In, Sn, Ge, Cr, Si, Al, Nb, Mo, Ti, Nb, Mo, Ti, W, Ta, and Zn, preferably a nitride of one or more elements selected from the group consisting of Si, Ge, and Ti. The sulfide may be, for example, Zn sulfide. The carbide may be, for example, a carbide of one or more elements selected from the group consisting of In, Sn, Ge, Cr, Si, Al, Ti, Zr, Ta, and W, preferably a carbide of one or more elements selected from the group consisting of Si, Ti, and W. The fluoride may be, for example, a fluoride of one or more elements selected from the group consisting of Si, Al, Mg, Ca, and La. Examples of a mixture thereof include ZnS—$SiO_2$, $SiO_2$—$In_2O_3$—$ZrO_2$ (SIZ), $SiO_2$—$Cr_2O_3$—$ZrO_2$ (SCZ), $In_2O_3$—$SnO_2$ (ITO), $In_2O_3$—$CeO_2$ (ICO), $In_2O_3$—$Ga_2O_3$ (IGO), $In_2O_3$—$Ga_2O_3$—ZnO (IGZO), $Sn_2O_3$—$Ta_2O_5$ (TTO), $TiO_2$—$SiO_2$, $Al_2O_3$—ZnO, and $Al_2O_3$—BaO.

(Intermediate Layers)

The intermediate layers S1 and S2 serve to separate the information signal layers L0 to L2 from one another with a distance long enough physically and optically, and the intermediate layers S1 and S2 each have a concave-convex surface. The concave-convex surface has, for example, a concentric circular or spiral land Ld and a concentric circular or spiral groove Gv. The thickness of the intermediate layers S1 and S2 is preferably set to 9 μm to 50 μm. The intermediate layers S1 and S2 are preferably, but not necessarily, made from an ultraviolet-curable acrylic resin. The intermediate layers S1 and S2 preferably have sufficiently high optical transparency because they form an optical path for a laser beam used to record or reproduce information signals on or from deeper layers.

(Optically Transparent Layer)

The optically transparent layer 12 is, for example, a resin layer formed by curing a photosensitive resin such as an ultraviolet-curable resin. The resin layer may be made from, for example, an ultraviolet-curable acrylic resin. Alternatively, the optically transparent layer 12 may include a ring-shaped optically transparent sheet and an adhesive layer for bonding the optically transparent sheet to the substrate 11. The optically transparent sheet is preferably made of a material with low ability to absorb a laser beam used for recording and reproduction. Specifically, the optically transparent sheet is preferably made of a material with a transmittance of 90% or more with respect to the laser beam. The optically transparent sheet may be made of, for example, a polycarbonate resin material or a polyolefin resin (such as ZEONEX (registered trademark)). The adhesive layer may be made using, for example, an ultraviolet-curable resin or a pressure sensitive adhesive (PSA).

The thickness of the optically transparent layer 12 is preferably selected in the range of 10 µm to 177 µm. High-density recording can be achieved using a combination of such a thin optically transparent layer 12 and an objective lens configured to have a high numerical aperture (NA) of, for example, about 0.85.

(Hard Coat Layer)

Although not shown, a hard coat layer may be further provided on the surface of the optically transparent layer 12 (laser beam-receiving surface), for example, to protect the medium from mechanical shock or scratches or protect the quality of recording/reproduction of information signals from deposition of dust or fingerprints during handling by users. The hard coat layer may be made using a material containing a silica gel fine powder for improving mechanical strength or using a solvent-containing or solvent-free ultraviolet-curable resin. To have high mechanical strength and water- or oil-repellency, the hard coat layer preferably has a thickness of about 1 µm to several µm.

(Rate of Track Cross Signal Displacement)

Figure 3:
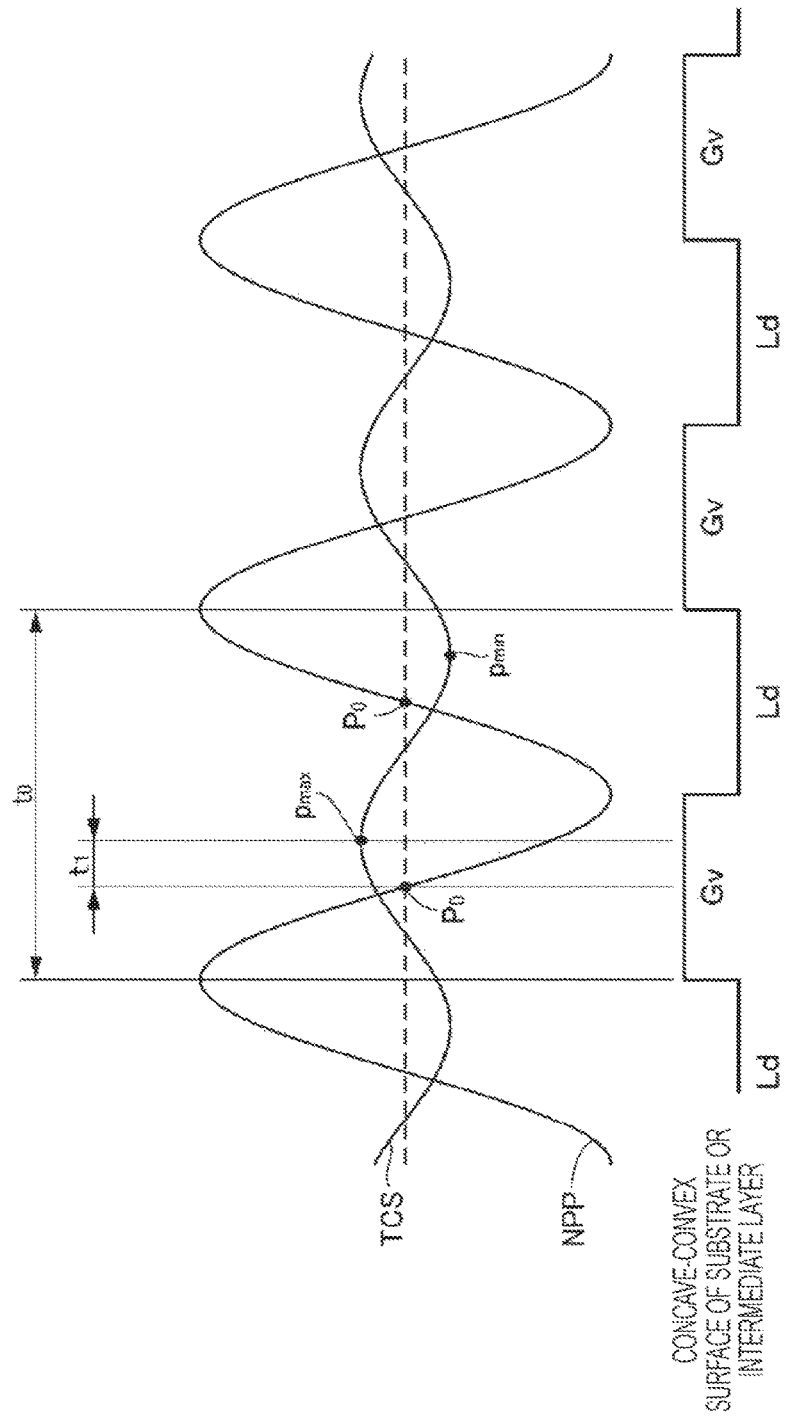
FIG. 3 is a schematic diagram for illustrating the rate of track cross signal displacement.

FIG. 3 is a schematic diagram for illustrating the rate of track cross signal displacement. The amount $t_1$ of track cross signal (TCS) displacement is defined as the amount of displacement of the position $p_{max}$ of the maximum track cross signal or the position $p_{min}$ of the minimum track cross signal from the position $P_0$ of the center of the amplitude of the push-pull signal. Ideally, the amount $t_1$ of track cross signal displacement is preferably 0 ($t_1=0$). However, it is generally difficult to set the displacement amount $t_1$ to 0, and the displacement amount $t_1$ is generally more than 0 ($t_1>0$). The displacement amount $t_1$ occurs due to the fact that the information signal layer L is not evenly deposited on the land Ld and the groove Gv during the deposition process, so that the information signal layer L is not symmetric with respect to the land Ld and the groove Gv of the substrate 11. The displacement amount $t_1$ tends to increase as the thickness of the information signal layer L increases.

The ratio ($t_1/t_0$) of the amount $t_1$ of track cross signal displacement to the period $t_0$ of the push-pull signal is preferably less than 0.16, more preferably 0.15 or less, even more preferably 0.1 or less. A ratio ($t_1/t_0$) of more than 0.25 means off-track. Taking driving margin into account, the ratio ($t_1/t_0$) should be less than 0.16.

(Reflectance)

In the description, the reflectance R of the information signal layer L in an unrecorded state at the groove Gv is called the groove reflectance $R_{g-v}$. The reflectance R of the information signal layer L in an unrecorded state at the land Ld is called the land reflectance $R_{l-v}$.

Among the plurality of information signal layers L0 to L2, the information signal layer L2 closest to the light-receiving surface C preferably has a groove reflectance $R_{g-v}$ of more than 4% (4%<$R_{g-v}$), more preferably more than 4% to 11% (4%<Rg-v≤11%), even more preferably more than 4% to 8% (4%<$R_{g-v}$≤8%), most preferably 4.4% to 8% (4.4%≤$R_{g-v}$≤8%). When $R_{g-v}$ is more than 4% (4%<$R_{g-v}$), the occurrence of off-track can be suppressed. When the complex metal oxide mentioned above is used as a recording material, it will be difficult to obtain the reflectance property 11%<$R_{g-v}$. When the $R_{g-v}$ is 8% or less ($R_{g-v}$≤8%), the information signal layer L2 can be formed with the same thickness as that of the thinnest information signal layer L0, which can lead to a reduction in manufacturing cost. The land reflectance $R_{l-v}$ is higher than the groove reflectance $R_{g-v}$. Therefore, when the groove reflectance $R_{g-v}$ falls within the reflectance range mentioned above, the land reflectance $R_{l-v}$ is deemed to also fall within the reflectance range mentioned above.

Preferably, there is a difference of 1% or more between the highest reflectance and the lowest reflectance among those of the information signal layers L0 to L2. In this case, the groove reflectance $R_{g-v}$ of the information signal layer L2 can be set high, so that the rate of track cross signal displacement can be reduced. Among the information signal layers L0 to L2, the information signal layer L2 closest to the light-receiving surface C preferably has the highest reflectance. The two adjacent information signal layers L preferably have substantially the same reflectance, or of the two adjacent information signal layers L, the information signal layer closer to the light-receiving surface C preferably has a reflectance higher than that of the other information signal layer.

[3 Method for Producing Optical Recording Medium]

Next, an example of a method for producing the optical recording medium according to an embodiment of the present technology will be described.

(Step of Forming Substrate)

First, a substrate 11 having a concave-convex surface as a principal surface is formed. The method of forming the substrate 11 may be, for example, injection molding or photo-polymer method (photo-polymerization (2P) technique).

(Step of Forming Information Signal Layer)

Subsequently, the substrate 11 is fed into a vacuum chamber equipped with a target for forming a dielectric layer, and the pressure in the vacuum chamber is reduced to a predetermined level. The target is then sputtered to deposit a dielectric layer 23 on the substrate 11 while process gases such as Ar and $O_2$ are introduced into the vacuum chamber. The sputtering may be, for example, radio frequency (RF) sputtering or direct current (DC) sputtering. Direct current sputtering is particularly preferred. As compared with radio frequency sputtering, direct current sputtering can be performed with an inexpensive system at a high deposition rate, which makes it possible to reduce the manufacturing cost and improve the productivity.

Subsequently, the substrate 11 is fed into a vacuum chamber equipped with a target for forming the recording layer described above, and the pressure in the vacuum chamber is reduced to a predetermined level. The target is then sputtered to deposit a recording layer 21 on the dielectric layer 23 while process gases such as Ar and $O_2$ are introduced into the vacuum chamber.

Subsequently, the substrate 11 is fed into a vacuum chamber equipped with a target for forming a dielectric layer, and the pressure in the vacuum chamber is reduced to a predetermined level. The target is then sputtered to deposit a dielectric layer 22 on the recording layer 21 while process gases such as Ar and $O_2$ are introduced into the vacuum chamber. The sputtering may be, for example, radio frequency (RF) sputtering or direct current (DC) sputtering. Direct current sputtering is particularly preferred. As compared with radio frequency sputtering, direct current sputtering can be performed at a high deposition rate, which makes it possible to improve the productivity.

Thus, an information signal layer L0 is formed on the substrate 11.

(Step of Forming Intermediate Layer)

Subsequently, an ultraviolet-curable resin is uniformly applied to the information signal layer L0, for example, by spin coating. A stamper with a concave-convex pattern is then pressed against the ultraviolet-curable resin, which has been uniformly applied to the information signal layer L0. After the ultraviolet-curable resin is cured by being irradiated with ultraviolet rays, the stamper is peeled off. In this way, the concave-convex pattern of the stamper is transferred to the ultraviolet-curable resin, and an intermediate layer S1, for example, having a land Ld and a groove Gv is formed on the information signal layer L0.

(Steps of Forming Information Signal Layers and Intermediate Layer)

Subsequently, an information signal layer L1, an intermediate layer S2, and an information signal layer L2 are stacked in this order on the intermediate layer S1 using the same steps as for the information signal layer L0 and the intermediate layer S1.

(Step of Forming Optically Transparent Layer)

Subsequently, a photosensitive resin such as an ultraviolet-curable resin (UV resin) is applied to the information signal layer L2, for example, by spin coating. The photosensitive resin is then cured by being irradiated with light such as ultraviolet rays. In this way, an optically transparent layer 12 is formed on the information signal layer L2.

The desired optical recording medium 10 is obtained by the steps described above.

[4 Advantageous Effects]

In the optical recording medium according to an embodiment, among the information signal layers L0 to L2, the information signal layer L2 closest to the light-receiving surface C has a reflectance of more than 4%. This feature makes it possible to reduce the thickness of the information signal layer L2 closest to the light-receiving surface C and to suppress undesired shaping of the land Ld and the groove Gv when the information signal layer L2 is deposited. Therefore, this can reduce the amount t1 of track cross signal displacement. In other words, this can suppress the occurrence of off-track.

EXAMPLES

Hereinafter, the present technology will be more specifically described with reference to examples. It will be understood that the examples are not intended to limit the present technology in any way.

Example 1-1

First, a 1.1-mm-thick polycarbonate substrate was formed by injection molding. A concave-convex surface having a groove and a land was formed on the polycarbonate substrate. Subsequently, a dielectric layer (substrate side), a recording layer, and a dielectric layer (optically transparent layer side) were sequentially deposited on the concave-convex surface of the polycarbonate substrate by sputtering. As a result, a 50-nm-thick first information signal layer (hereinafter referred to as a "L0 layer") was formed on the concave-convex surface of the polycarbonate substrate. Table 1 shows the specific features of the L0 layer.

Subsequently, an ultraviolet-curable resin was uniformly applied to the L0 layer by spin coating. The concave-convex pattern of a stamper was then pressed against the ultraviolet-curable resin, which had been uniformly applied to the L0 layer. The ultraviolet-curable resin was cured by being irradiated with ultraviolet rays, and then the stamper was removed. As a result, an intermediate layer having grooves and lands was formed.

Subsequently, a 57-nm-thick second information signal layer (hereinafter referred to as a "L1 layer") was formed by sequentially depositing a dielectric layer (substrate side), a recording layer, and a dielectric layer (optically transparent layer side) on the concave-convex surface of the intermediate layer. Table 1 shows the specific features of the L1 layer.

Subsequently, an ultraviolet-curable resin was uniformly applied to the L1 layer by spin coating. The concave-convex pattern of a stamper was then pressed against the ultraviolet-curable resin, which had been uniformly applied to the L1 layer. The ultraviolet-curable resin was cured by being irradiated with ultraviolet rays, and then the stamper was peeled off. As a result, an intermediate layer having grooves and lands was formed.

Subsequently, a 65-nm-thick third information signal layer (hereinafter referred to as a "L2 layer") was formed by sequentially depositing a dielectric layer (substrate side), a recording layer, and a dielectric layer (optically transparent layer side) on the concave-convex surface of the intermediate layer. Table 1 shows the specific features of the L2 layer.

Subsequently, an ultraviolet-curable resin was uniformly applied to the L2 layer by spin coating and then cured by being irradiated with ultraviolet rays to form an optically transparent layer. In this way, a desired optical disk (optical recording medium) was obtained.

Example 1-2

An optical disk was obtained as in Example 1-1, except that the thickness of each of the L0, L1, and L2 layers was changed as shown in Table 1.

(Reflectance)

The reflectance of the L0, L1, and L2 layers of the optical disk obtained as described above was evaluated as described below.

The reflectance R0 of the groove of a reflectance standard disk was measured as described below. First, an amorphous silicon layer was deposited on the substrate surface having lands and grooves, and then a cover layer was formed on the amorphous silicon layer, so that a single layer (SL) structured reflectance standard disk was obtained. Subsequently, the reflectance R0 of the groove of the reflectance standard disk was measured at 405 nm using a variable angle spectroscopic ellipsometer (manufactured by J. A. Woollam Co., Inc.).

The amount V0 of light returned from the groove of the reflectance standard disk and the amount V1 of light returned from the groove of the optical disk to be measured for reflectance (hereinafter referred to as the "sample disk") were determined as described below. First, the amount V0 of light returned from the groove of the reflectance standard disk was measured using a disc evaluation unit (ODU-1000 manufactured by PULSTEC INDUSTRIAL CO., LTD.) with a fixed reproduction power Pw (Pr0). Next, the amount V1 of light returned from the groove of the sample disk was measured using the same evaluation unit with a reproduction power of Pr0. In this case, the amounts V0 and V1 of returned light were all measured using a laser beam with a wavelength of 405 nm.

Figure 4A:
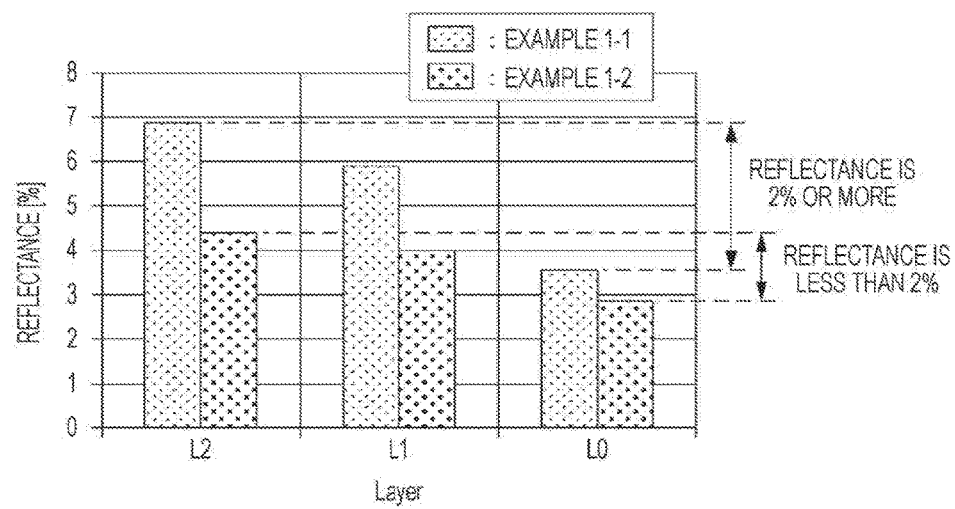
FIG. 4A is a graph showing the reflectances of the optical disks of Examples 1-1 and 1-2.

The reflectance R1 ($R_{g-v}$) was calculated by substituting, into the formula below, the reflectance R0 and the amounts V0 and V1 of returned light measured as described above. FIG. 4A shows the results.

$$R1 = (R0/V0) \times V1$$

(Rate of Track Cross Signal Displacement)

Figure 4B:
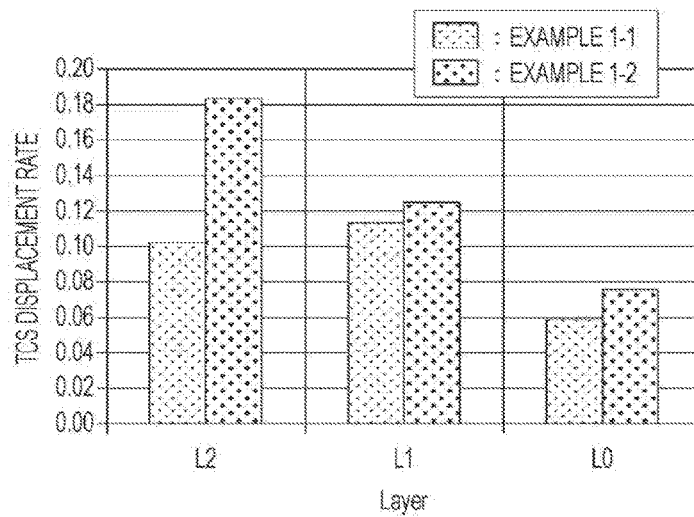
FIG. 4B is a graph showing the track cross signal displacement rates of the optical disks of Examples 1-1 and 1-2.

The rate of the track cross signal displacement from each of the L0, L1, and L2 layers of the optical disk obtained as described above was measured as described below. First, the push-pull signal and the track cross signal were detected using an oscilloscope. The period $t_0$ of the detected push-pull signal was then determined in a certain fraction of the signal. Next, the amount $t_1$ of displacement of the track cross signal was determined in the same fraction as that for the determination of the period of the push-pull signal. Next, the rate of track cross signal displacement was calculated as the ratio ($t_1/t_0$) of the amount $t_1$ of displacement of the track cross signal to the period $t_0$ of the push-pull signal. FIG. 4B shows the results.

Table 1 shows the features of the optical disks of Examples 1-1 and 1-2.

In order to suppress off-track, therefore, the reflectance should preferably be unbalanced between the respective layers, and the reflectance difference $\Delta R_{max}$ should preferably be at least 2%.

Examples 2-1 to 2-7 and Comparative Examples 2-1 to 2-7

Optical disks were obtained as in Example 1-1, except that the reflectance was changed by modifying the thickness of the L2 layer in the range of 59 nm to 72 nm.
(Reflectance and Rate of Track Cross Signal Displacement)

Figure 5:
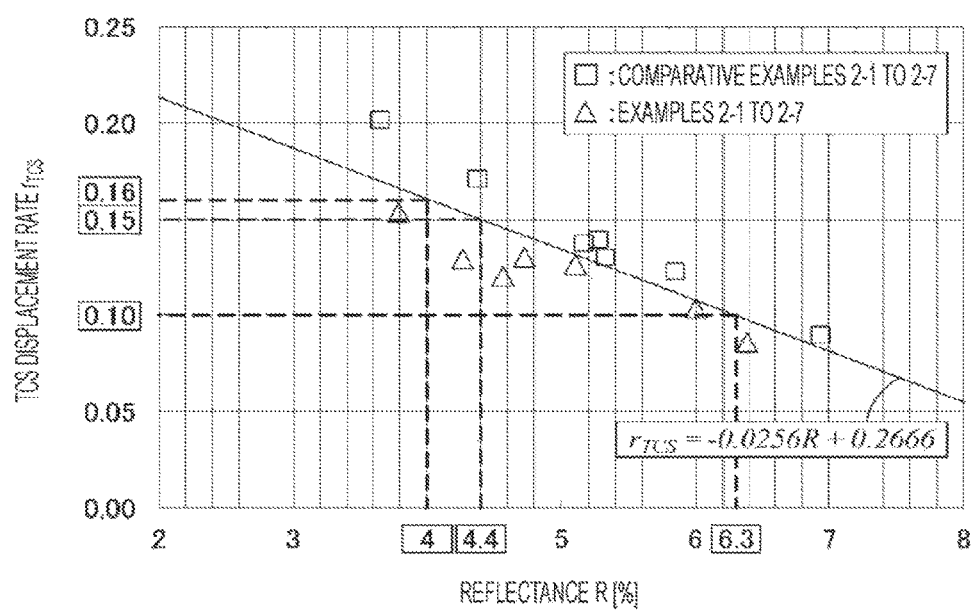
FIG. 5 is a graph showing the relationship between the track cross signal and the reflectances of the third information signal layers of the optical disks of Examples 2-1 to 2-7 and Comparative Examples 2-1 to 2-7.

The L2 layers of the optical disks obtained as described above were evaluated for reflectance and rate of track cross signal displacement as in Examples 1-1 and 1-2. FIG. 5 shows the results. The approximate straight light $r_{TCS} = -0.0265R + 0.2666$ shown in FIG. 5 was calculated by linear approximation using least squares method.

FIG. 5 shows the following.

When the reflectance of the groove is set to higher than 4.0%, the rate of track cross signal displacement can be reduced to less than 0.16.

TABLE 1

|  | Layer type | Dielectric layer (Substrate side) Thickness [nm] | Material | Recording layer Thickness [nm] | Material | Dielectric layer (Optically transparent layer side) Thickness [nm] | Material | Total thickness [nm] of information signal layer |
|---|---|---|---|---|---|---|---|---|
| Example 1-1 | L2 layer | 16 | SIZ | 33 | Mn—W—Zn—Cu—O | 16 | SIZ | 65 |
|  | L1 layer | 10 |  | 37 |  | 10 |  | 57 |
|  | L0 layer | 8 |  | 34 |  | 8 |  | 50 |
| Example 1-2 | L2 layer | 13 | SIZ | 33 | Mn—W—Zn—Cu—O | 26 | SIZ | 72 |
|  | L1 layer | 13 |  | 37 |  | 13 |  | 63 |
|  | L0 layer | 10 |  | 34 |  | 10 |  | 54 |

FIGS. 4A and 4B show the following.

The dielectric layer on the optically transparent layer side is thinner in Example 1-1 than in Example 1-2. Therefore, the reflectance of each layer (particularly the reflectance of the L2 layer) is higher in Example 1-1 than in Example 1-2. This leads to the fact that among the L0, L1, and L2 layers, the reflectance difference $\Delta R_{max}$ between the L2 layer with the highest reflectance and the L0 layer with the lowest reflectance is at least 2% (specifically, in the range of 3% to 4%). The displacement rate tends to be lower for the optical disk of Example 1-1 with such reflectance properties than for the optical disk of Example 1-2.

On the other hand, the dielectric layer on the optically transparent layer side is thicker in Example 1-2 than in Example 1-1. Therefore, the reflectance of each layer (particularly the reflectance of the L2 layer) is lower in Example 1-2 than in Example 1-2. This leads to the fact that among the L0, L1, and L2 layers, the reflectance difference $\Delta R_{max}$ between the L2 layer with the highest reflectance and the L0 layer with the lowest reflectance is less than 2%. The displacement rate tends to be higher for the optical disk of Example 1-2 with such reflectance properties than for the optical disk of Example 1-1.

When the reflectance of the groove is set to 4.4% or more, the rate of track cross signal displacement can be reduced to 0.15 or less.

When the reflectance of the groove is set to 6.3% or more, the rate of track cross signal displacement can be reduced to 0.1 or less.

Examples 3-1 to 3-3

Optical disks were obtained as in Example 1-1, except that the reflectance was changed by modifying the thickness of each of the L0, L1, and L2 layers as shown in Table 2.
(Reflectance and Rate of Track Cross Signal Displacement)

Figure 6A:
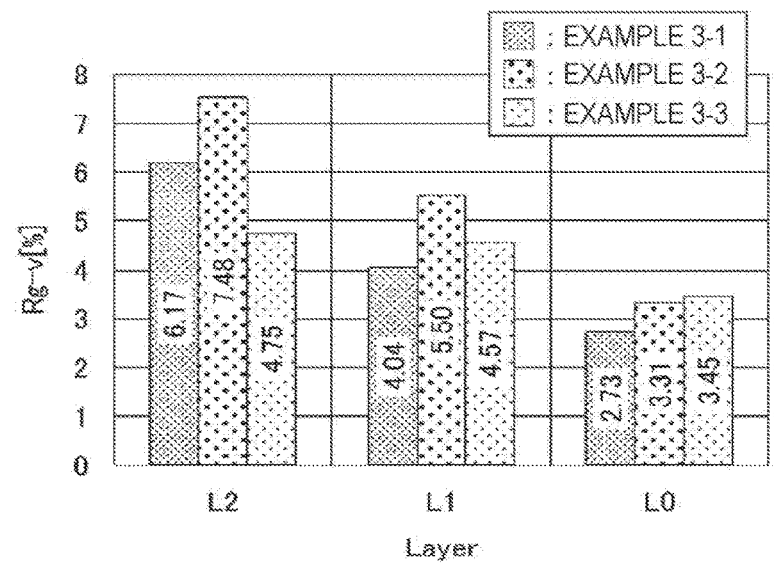
FIG. 6A is a graph showing the reflectance of the groove of each of the optical disks of Examples 3-1 to 3-3.
Figure 6B:
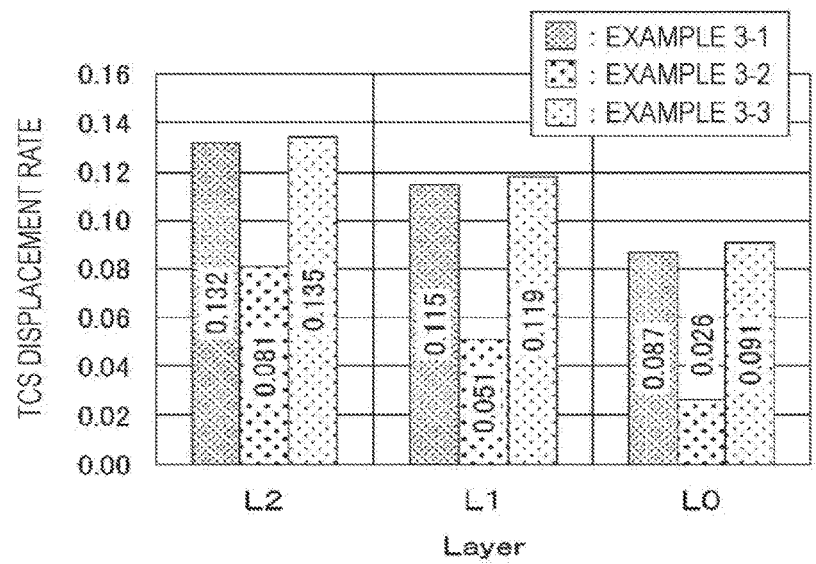
FIG. 6B is a graph showing the track cross signal displacement rates of the optical disks of Examples 3-1 to 3-3.

The L0, L1, and L3 layers of each optical disk obtained as described above were evaluated for reflectance and rate of track cross signal displacement as in Examples 1-1 and 1-2. FIGS. 6A and 6B show the results.

Table 2 shows the features of the optical disks of Examples 3-1 to 3-3.

TABLE 2

| | Layer type | Dielectric layer (Substrate side) Thickness [nm] | Material | Recording layer Thickness [nm] | Material | Dielectric layer (Optically transparent layer side) Thickness [nm] | Material | Total thickness [nm] of information signal layer |
|---|---|---|---|---|---|---|---|---|
| Example 3-1 | L2 layer | 17 | SIZ | 35 | Mn—W—Zn—Cu—O | 17 | SIZ | 69 |
| | L1 layer | 17 | | 35 | | 17 | | 69 |
| | L0 layer | 10 | | 39 | | 10 | | 59 |
| Example 3-2 | L2 layer | 16 | SIZ | 36 | Mn—W—Zn—Cu—O | 16 | SIZ | 68 |
| | L1 layer | 10 | | 36 | | 10 | | 56 |
| | L0 layer | 8 | | 34 | | 8 | | 50 |
| Example 3-3 | L2 layer | 20 | SIZ | 35 | Mn—W—Zn—Cu—O | 20 | SIZ | 75 |
| | L1 layer | 15 | | 35 | | 15 | | 65 |
| | L0 layer | 8 | | 34 | | 8 | | 50 |

FIGS. 6A and 6B show the following.

In Example 3-1, the L2 layer closest to the light-receiving surface has a reflectance of at least 6%, and among the L0, L1, and L2 layers, the reflectance difference $\Delta R_{max}$ is at least 3% between the L2 layer with the highest reflectance and the L0 layer with the lowest reflectance. In the optical disk of Example 3-1 with such reflectance properties, the displacement rate for the L2 layer with the highest displacement rate can be reduced to at most 0.14 among the L0, L1, and L2 layers.

In Example 3-2, the L2 layer has a reflectance of at least 7%, and the reflectance difference $\Delta R_{max}$ is at least 4%. In the optical disk of Example 3-2 with such reflectance properties, the displacement rate for the L2 layer can be reduced to about 0.08.

In Example 3-3, the L2 layer has a reflectance of more than 4%, and the reflectance difference $\Delta R_{max}$ is at least 1%. In the optical disk of Example 3-3 with such reflectance properties, the displacement rate for the L2 layer can be reduced to at most 0.14.

Considering all the evaluation results shown above, it is concluded that the displacement rate tends to decrease as the reflectance of the L2 layer closest to the light-receiving surface increases in the optical disk and as the reflectance difference $\Delta R_{max}$ increases in the optical disk.

It is also found that the reflectance of the L2 layer closest to the light-receiving surface should preferably be more than 4%, more preferably 6% or more, even more preferably 7% or more.

It is also found that the reflectance difference $\Delta R_{max}$ should preferably be 1% or more, more preferably 3% or more, even more preferably 4% or more.

Examples 4-1 to 4-3

As shown in Table 3, the thickness of each of the L0, L1, and L2 layers was changed. In addition, the L2 layer was composed of W—Zn—Mn—O, and the Mn content was set to 27% by atom based on the total amount of W, Zn, and Mn. Note that Mn is a metal material with an extinction coefficient higher than those of W and Zn. Optical disks were obtained as in Example 1-1, except for the above.

Examples 5-1 to 5-3

Optical disks were obtained as in Examples 4-1 to 4-3, except that the L2 layer was composed of W—Zn—Mn—Cu—O as shown in Table 4. The L2 layer had a Mn content of 25% by atom based on the total amount of W, Zn, Mn, and CU and had a Cu content of 25% by atom based on the total amount of W, Zn, Mn, and Cu. Note that Mn and Cu are metal materials with extinction coefficients higher than those of W and Zn.

Examples 6-1 to 6-3

Optical disks were obtained as in Example 4-1, except that as shown in Table 5, the ratio ($t_2/t_1$) of the thickness $t_2$ of the dielectric layer on the optically transparent layer side to the thickness $t_1$ of the dielectric layer on the substrate side was changed while the thickness of the L2 layer was kept at 69 nm.

Examples 7-1 to 7-3

Optical disks were obtained as in Example 4-1, except that as shown in Table 5, the ratio ($t_2/t_1$) of the thickness $t_2$ of the dielectric layer on the optically transparent layer side to the thickness $t_1$ of the dielectric layer on the substrate side was changed while the thickness of the L2 layer was kept at 72 nm.

(Signal Characteristics)

Figure 7A:
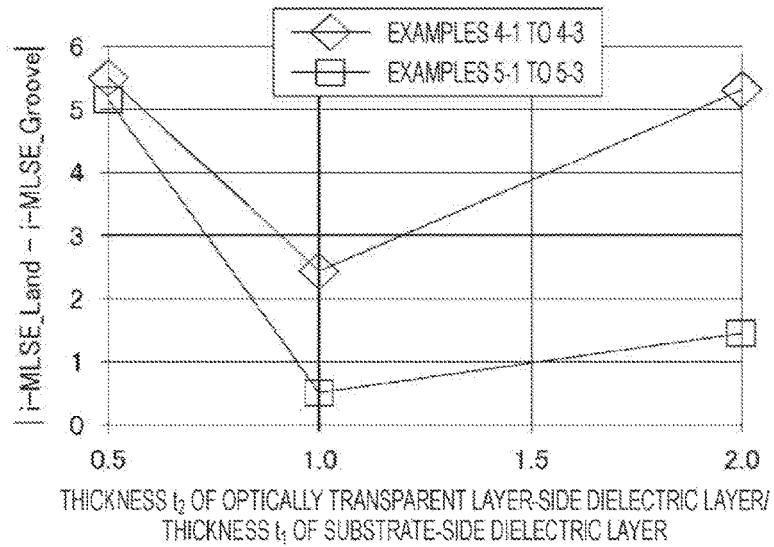
FIG. 7A is a graph showing the relationship between the value $|\Delta(\text{i-MLSE})_{L-G}|$ and the dielectric layer thickness ratio $t_2/t_1$ of each of the optical disks of Examples 4-1 to 4-3 and 5-1 to 5-3.
Figure 8A:
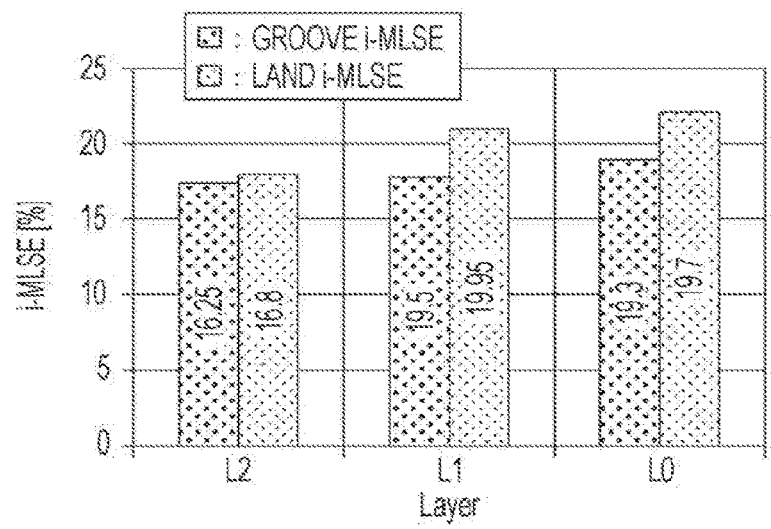
FIG. 8A is a graph showing the i-MLSE of the optical disk of Example 5-2.

The quality of recording on the optical disks of Examples 4-1 to 4-3 and 5-1 to 5-3 obtained as described above was evaluated as described below using a BD evaluation system. First, information signals were recorded at a density of 35 GB per information recording layer and a double speed (7.69 m/s) on five land tracks and five groove tracks of the L2 layer, and then the quality of signals from their central land and grove tracks was evaluated. The evaluation of the signal quality was performed using an index called i-MLSE, which is used for BD-XL. In the evaluation system, the recording laser beam has a wavelength of 405 nm, and the condenser lens has a numerical aperture NA of 0.85. Subsequently, the absolute value of the i-MLSE difference between the land track and the groove track of the L2 layer was calculated ($|\Delta(\text{i-MLSE})_{L-G}|=|$(the i-MLSE for the land track of the L2 layer)−(the i-MLSE for the groove track of the L2 layer)$|$). FIG. 7A shows the results. FIG. 8A shows the i-MLSE for the optical disk of Example 5-2.

(Reflectance and Rate of Track Cross Signal Displacement)

Figure 7B:
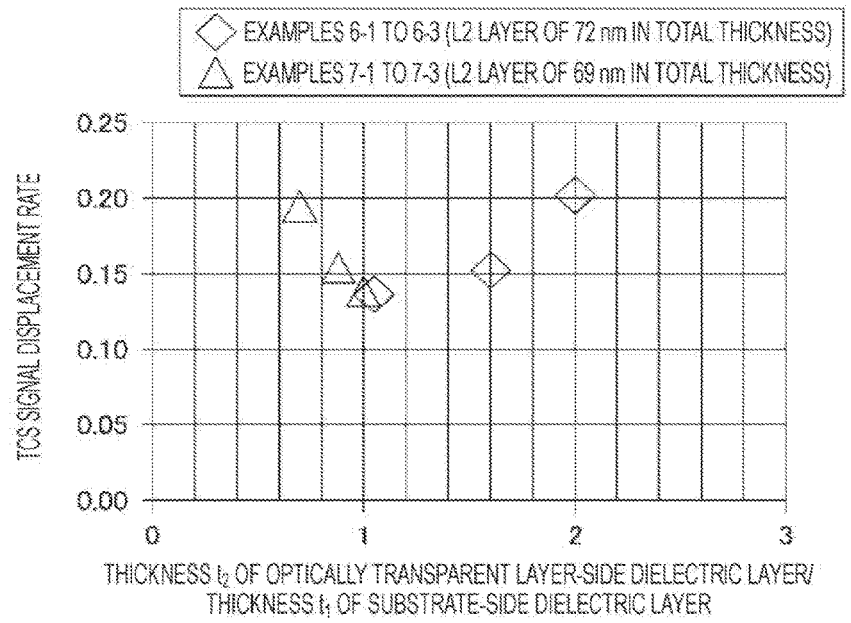
FIG. 7B is a graph showing the relationship between the track cross signal displacement rate and the dielectric layer thickness ratio $t_2/t_1$ of each of the optical disks of Examples 6-1 to 6-3 and 7-1 to 7-3.

The optical disks of Examples 6-1 to 6-3 and 7-1 to 7-3 obtained as described above were evaluated for rate of track cross signal displacement as in Examples 1-1 and 1-2. FIG. 7B shows the results.

Figure 8B:
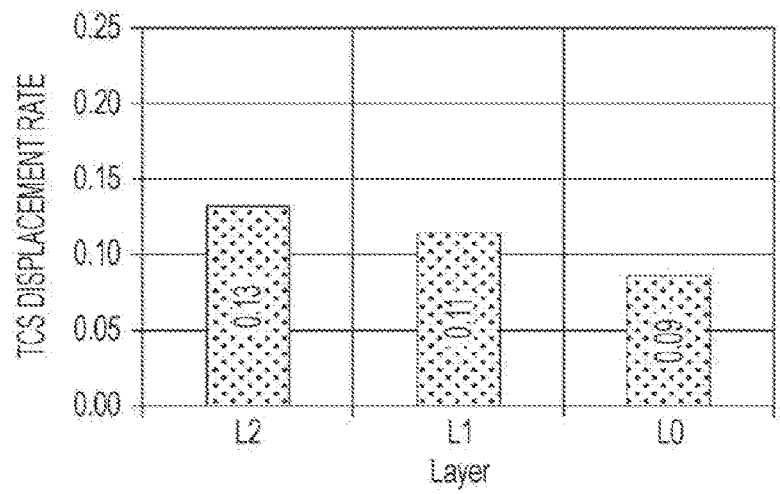
FIG. 8B is a graph showing the track cross signal displacement rate of the optical disk of Example 5-2.
Figure 8C:
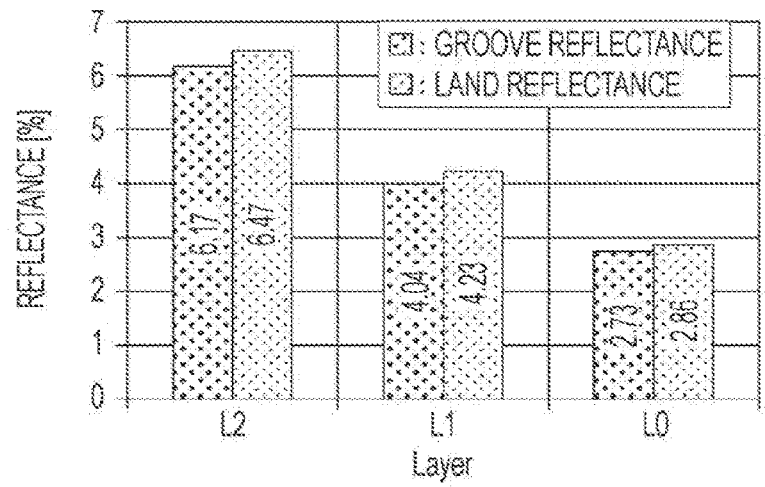
FIG. 8C is a graph showing the reflectance of the optical disk of Example 5-2.

The L0, L1, and L2 layers of the optical disk of Example 5-2 obtained as described above were evaluated for reflectance, rate of track cross signal reflection, and rate of track cross signal displacement as in Examples 1-1 and 1-2. FIGS. 8B and 8C show the results.

(NPPR for Land)

Figure 9A:
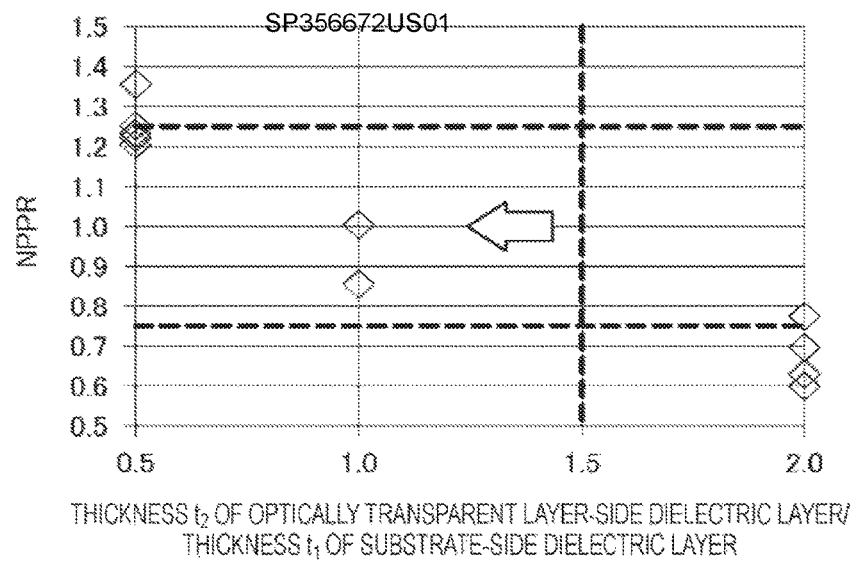
FIG. 9A is a graph showing the relationship between the dielectric layer thickness ratio $t_2/t_1$ and the NPPR during recording on the land of each of the optical disks of Examples 5-1 to 5-3.

Information signals were recorded on the lands of the optical disks of Examples 5-1 to 5-3 obtained as described above using different recording powers Pw in the range from the optimum recording power Pwo to Pwo×0.1 (10%). The optimum recording power Pwo was the recording power with which the best i-MLSE was achieved. The information signals were recorded at a density of 35 GB per information recording layer and a double speed (7.69 m/s). Subsequently, the NPPR was calculated for the land of each optical disk, on which the information signals were recorded with different recording powers Pw. FIG. 9A shows the results.

(NPPR for Groove)

Figure 9B:
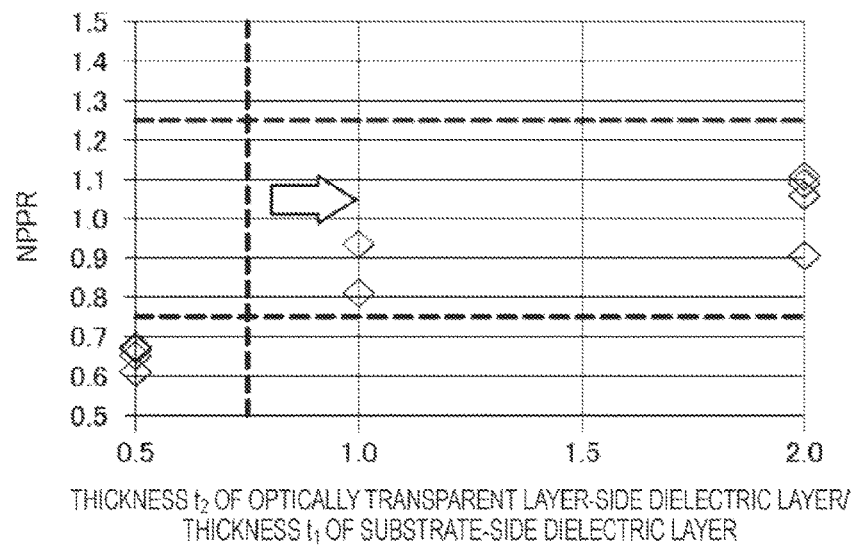
FIG. 9B is a graph showing the relationship between the dielectric layer thickness ratio $t_2/t_1$ and the NPPR during recording on the groove of each of the optical disks of Examples 5-1 to 5-3.

The NPPR for the groove of each of the optical disks of Examples 5-1 to 5-3 obtained as described above was calculated in the same manner as for the NPPR for the land, except that the information signals were recorded on the groove of the optical disk. FIG. 9B shows the results.

Table 3 shows the features of the optical disks of Examples 4-1 to 4-3.

TABLE 3

| | Layer type | Dielectric layer (Substrate side) | | Recording layer | | Dielectric layer (Optically transparent layer side) | | Total thickness [nm] of each information signal layer | Dielectric layer thickness ratio (t2/t1) |
|---|---|---|---|---|---|---|---|---|---|
| | | Thickness t1 [nm] | Material | Thickness t3 [nm] | Material | Thickness t2 [nm] | Material | | |
| Example 4-1 | L2 layer | 28 | SIZ | 33 | W—Zn—Mn—O | 14 | SIZ | 75 | 0.5 |
| | L1 layer | 10 | | 36 | W—Zn—Mn—Cu—O | 10 | | 56 | — |
| | L0 layer | 8 | | 34 | W—Zn—Mn—Cu—O | 8 | | 50 | — |
| Example 4-2 | L2 layer | 16 | SIZ | 33 | W—Zn—Mn—O | 16 | SIZ | 65 | 1 |
| | L1 layer | 10 | | 36 | W—Zn—Mn—Cu—O | 10 | | 56 | — |
| | L0 layer | 8 | | 34 | W—Zn—Mn—Cu—O | 8 | | 50 | — |
| Example 4-3 | L2 layer | 14 | SIZ | 33 | W—Zn—Mn—O | 28 | SIZ | 75 | 2 |
| | L1 layer | 10 | | 36 | W—Zn—Mn—Cu—O | 10 | | 56 | — |
| | L0 layer | 8 | | 34 | W—Zn—Mn—Cu—O | 8 | | 50 | — |

Table 4 shows the features of the optical disks of Examples 5-1 to 5-3.

TABLE 4

| | Layer type | Dielectric layer (Substrate side) | | Recording layer | | Dielectric layer (Optically transparent layer side) | | Total thickness [nm] of each information signal layer | Dielectric layer thickness ratio (t2/t1) |
|---|---|---|---|---|---|---|---|---|---|
| | | Thickness t1 [nm] | Material | Thickness t3 [nm] | Material | Thickness t2 [nm] | Material | | |
| Example 5-1 | L2 layer | 28 | SIZ | 33 | W—Zn—Mn—Cu—O | 14 | SIZ | 75 | 0.5 |
| | L1 layer | 10 | | 36 | W—Zn—Mn—Cu—O | 10 | | 56 | — |
| | L0 layer | 8 | | 34 | W—Zn—Mn—Cu—O | 8 | | 50 | — |
| Example 5-2 | L2 layer | 16 | SIZ | 33 | W—Zn—Mn—Cu—O | 16 | SIZ | 65 | 1 |
| | L1 layer | 10 | | 36 | W—Zn—Mn—Cu—O | 10 | | 56 | — |
| | L0 layer | 8 | | 34 | W—Zn—Mn—Cu—O | 8 | | 50 | — |

TABLE 4-continued

| | Layer type | Dielectric layer (Substrate side) | | Recording layer | | Dielectric layer (Optically transparent layer side) | | Total thickness [nm] of each information signal layer | Dielectric layer thickness ratio ($t_2/t_1$) |
|---|---|---|---|---|---|---|---|---|---|
| | | Thickness $t_1$ [nm] | Material | Thickness $t_3$ [nm] | Material | Thickness $t_2$ [nm] | Material | | |
| Example 5-3 | L2 layer | 14 | SIZ | 33 | W—Zn—Mn—Cu—O | 28 | SIZ | 75 | 2 |
| | L1 layer | 10 | | 36 | W—Zn—Mn—Cu—O | 10 | | 56 | — |
| | L0 layer | 8 | | 34 | W—Zn—Mn—Cu—O | 8 | | 50 | — |

Table 5 shows the features of the optical disks of Examples 6-1 to 6-3 and 7-1 to 7-3.

TABLE 5

| | Layer type | Dielectric layer (Substrate side) | | Recording layer | | Dielectric layer (Optically transparent layer side) | | Total thickness [nm] of each information signal layer | Dielectric layer thickness ratio ($t_2/t_1$) |
|---|---|---|---|---|---|---|---|---|---|
| | | Thickness $t_1$ [nm] | Material | Thickness $t_3$ [nm] | Material | Thickness $t_2$ [nm] | Material | | |
| Example 6-1 | L2 layer | 20 | SIZ | 35 | Mn—W—Zn—Cu—O | 14 | SIZ | 69 | 0.7 |
| Example 6-2 | L2 layer | 18 | SIZ | 35 | Mn—W—Zn—Cu—O | 16 | SIZ | 69 | 0.89 |
| Example 6-3 | L2 layer | 17 | SIZ | 35 | Mn—W—Zn—Cu—O | 17 | SIZ | 69 | 1 |
| Example 7-1 | L2 layer | 19 | SIZ | 33 | Mn—W—Zn—Cu—O | 20 | SIZ | 72 | 1.05 |
| Example 7-2 | L2 layer | 15 | SIZ | 33 | Mn—W—Zn—Cu—O | 24 | SIZ | 72 | 1.6 |
| Example 7-3 | L2 layer | 13 | SIZ | 33 | Mn—W—Zn—Cu—O | 26 | SIZ | 72 | 2 |

FIG. 7A shows the following.

The absolute value $|\Delta(\text{i-MLSE})_{L-G}|$ is the minimum when the ratio ($t_2/t_1$) of the thickness $t_2$ of the dielectric layer on the optically transparent layer side to the thickness $t_1$ of the dielectric layer on the substrate side is 1.0.

In order to reduce $|\Delta(\text{i-MLSE})_{L-G}|$, therefore, the thickness $t_1$ of the dielectric layer on the substrate side is preferably substantially the same as the thickness $t_2$ of the dielectric layer on the optically transparent layer side.

FIG. 7B shows the following.

The rate of track cross signal displacement is the minimum when the ratio ($t_2/t_1$) of the thickness $t_2$ of the dielectric layer on the optically transparent layer side to the thickness $t_1$ of the dielectric layer on the substrate side is 1.0.

In order to reduce the rate of track cross signal displacement, therefore, the thickness $t_1$ of the dielectric layer on the substrate side is preferably substantially the same as the thickness $t_2$ of the dielectric layer on the optically transparent layer side.

FIGS. 8A to 8C show the following.

When the ratio ($t_2/t_1$) of the thickness $t_2$ of the dielectric layer on the optically transparent layer side to the thickness $t_1$ of the dielectric layer on the substrate side is 1.0, $|\Delta(\text{i-MLSE})_{L-G}|$ can be reduced to at most 3% for all the L0, L1, and L2 layers. In this case, the rate of track cross signal displacement can also be reduced to at most 0.15 for all the L0, L1, and L2 layers. In the optical disks with such advantages, the reflectance difference $\Delta R_{max}$ falls within the range of 1% to 4%.

FIGS. 9A and 9B show the following.

The dielectric layer thickness ratio $t_2/t_1$ should preferably be in the range of 0.75 to 1.5, more preferably about 1, in order to keep the NPPR within the range ±25% when the recording power is changed in the range from the optimum recording power Pwo to Pwo×0.1 (10%).

The present technology has been described specifically with reference to embodiments. It will be understood that the above embodiments are not intended to limit the present technology and that various modifications thereof may be made based on the present technical idea.

For example, the structures, methods, steps, shapes, materials, numerical values, and other features described in connection with the above embodiments are by way of example only, and may be changed or modified as needed.

In addition, any combination of the structures, methods, steps, shapes, materials, numerical values, and other features described in connection with the above embodiments is possible without departing from the gist of the present technology.

The above embodiments have shown cases where the plurality of information signal layers have the same layer structure. Alternatively, the plurality of information signal layers may have different layer structures depending on the properties required of each information signal layer (such as optical properties and durability). In view of productivity, however, all the information signal layers preferably have the same layer structure.

The above embodiments have shown a structure in which the information signal layer includes a recording layer, a dielectric layer provided adjacent to the upper surface of the recording layer, and another dielectric layer provided adjacent to the lower surface of the recording layer. It will be understood that the structure of the information signal layer is not limited to this structure. Alternatively, for example, the dielectric layer may be provided on only one of the upper and lower surfaces of the recording layer. Alternatively, the information signal layer may consist of only a single recording layer. With such a simple structure, the optical recording medium can be manufactured at low cost with high productivity. This effect will become more pronounced with increasing number of information signal layers in the medium.

The above embodiments have also shown examples where the present technology is applied to an optical recording medium that includes a substrate and a plurality of information signal layers and an optically transparent layer stacked in this order on the substrate and allows information signals to be recorded on or reproduced from the plurality of information signal layers when a laser beam is applied to the information signal layers from the optically transparent layer side. It will be understood that such examples are not intended to limit the present technology. For example, the present technology is also applicable to an optical recording medium that includes a substrate and a plurality of information signal layers and a protective layer stacked in this order on the substrate and allows information signals to be recorded on or reproduced from the plurality of information signal layers when a laser beam is applied to the information signal layers from the substrate side, or the present technology is also applicable to an optical recording medium that includes two substrate and a plurality of information signal layers provided between the substrates and allows information signals to be recorded on or reproduced from the plurality of information signal layers when a laser beam is applied to the information signal layers from at least one of the two substrate sides.

The above embodiments have also shown exemplary optical recording media each having three information signal layers. Alternatively, the present technology is also applicable to an optical recording medium having two information signal layers or four or more information signal layers.

The present technology may also have the following features.

(1) An optical recording medium including a plurality of information signal layers, wherein among the plurality of information signal layers, an information signal layer closest to a light-receiving surface has a reflectance of more than 4%.

(2) The optical recording medium according to (1), wherein among the plurality of information signal layers, there is a reflectance difference of 1% or more between an information signal layer with the highest reflectance and another information signal layer with the lowest reflectance.

(3) The optical recording medium according to (1) or (2), wherein the reflectance is in the range of 4.4% to 8%.

(4) The optical recording medium according to any of (1) to (3), which shows a rate of track cross signal displacement of less than 0.16.

(5) The optical recording medium according to any of (1) to (3), which shows a rate of track cross signal displacement of 0.15 or less.

(6) The optical recording medium according to any of (1) to (5), wherein the plurality of information signal layers each include a first dielectric layer, a recording layer, and a second dielectric layer.

(7) The optical recording medium according to (6), wherein the first and second dielectric layers have substantially the same thickness.

(8) The optical recording medium according to (6) or (7), wherein the recording layer includes a complex oxide containing a first metal and a second metal, wherein the first metal is at least one selected from the group consisting of W, Zn, Mg, Zr, Si, In, Sn, Sb, and Te, and the second metal is at least one selected from the group consisting of Mn, Pd, Fe, Ni, Cu, Ag, and Ru.

(9) The optical recording medium according to any of (1) to (8), wherein the information signal layers each have concave and convex tracks and each allow an information signal to be recorded on both the concave and convex tracks.

(10) The optical recording medium according to (9), wherein there is a pitch of 0.225 nm or less between the concave and convex tracks.

(11) The optical recording medium according to any of (1) to (10), wherein two adjacent information signal layers have substantially the same reflectance, or of two adjacent information signal layers, one closer to the light-receiving surface has a reflectance higher than that of the other.

REFERENCE SIGNS LIST

10 Optical recording medium
11 Substrate
12 Optically transparent layer
21 Recording layer
22, 23 Dielectric layer
L, L0 to L2 Information signal layer
S1, S2 Intermediate layer
Gv Groove
Gd Land
C Light-receiving surface

The invention claimed is:

1. An optical recording medium, comprising:
a light-receiving surface configured to receive incident light; and
at least three information signal layers,
wherein a first information signal layer of the at least three information signal layers is closest to the light-receiving surface and has a first reflectance in a range of 4% to 11%, and
wherein a reflectance difference between the first information signal layer and a third information signal layer of the at least three information signal layers is at least 1%.

2. The optical recording medium according to claim 1, wherein the reflectance difference is at least 2%.

3. The optical recording medium according to claim 1, wherein a rate of track cross signal displacement is less than 0.16.

4. The optical recording medium according to claim 1, wherein a rate of track cross signal displacement is at most 0.15.

5. The optical recording medium according to claim 1, wherein each information signal layer of the at least three information signal layers comprises a first dielectric layer, a recording layer, and a second dielectric layer.

6. The optical recording medium according to claim 5, wherein a first thickness of the first dielectric layer is same as a second thickness of the second dielectric layer.

7. The optical recording medium according to claim 5, wherein
the recording layer comprises a complex oxide of a first metal and a second metal,
wherein the first metal is at least one selected from the group consisting of W, Zn, Mg, Zr, Si, In, Sn, Sb, and Te, and
wherein the second metal is at least one selected from the group consisting of Mn, Pd, Fe, Ni, Cu, Ag, and Ru.

8. The optical recording medium according to claim 1, wherein each information signal layer of the at least three information signal layers comprises a concave track and a convex track, and
wherein both of the concave track and the convex track are configured to record an information signal.

9. The optical recording medium according to claim 8, wherein a pitch between the concave track and the convex track is at most 0.225 nm.

10. The optical recording medium according to claim 1, wherein a second information signal layer of the at least three information signal layers has a second reflectance and the third information signal layer has a third reflectance,
wherein the second reflectance is same as the third reflectance, or
wherein the second information signal layer is closer to the light-receiving surface than the third information signal layer, and has the second reflectance higher than the third reflectance.

11. The optical recording medium according to claim 1, wherein the first reflectance is in a range of 8% to 11%.

12. The optical recording medium according to claim 1, wherein the first reflectance is in a range of 6.3% to 8%.

13. The optical recording medium according to claim 1, wherein a thickness of the first information signal layer is between 59-72 nm.

14. The optical recording medium according to claim 1, wherein the first reflectance is in a range of 6.3% to 11%.

* * * * *